US009878392B2

(12) United States Patent
Williams

(10) Patent No.: US 9,878,392 B2
(45) Date of Patent: Jan. 30, 2018

(54) SYSTEM AND METHOD FOR MULTIVERSE CONTROLS

(71) Applicant: LINCOLN GLOBAL, INC., City of Industry, CA (US)

(72) Inventor: Christopher Williams, Newcastle upon Tyne (GB)

(73) Assignee: LINCOLN GLOBAL, INC., City of Industry, CA (US)

( * ) Notice: Subject to any disclaimer, the term of this patent is extended or adjusted under 35 U.S.C. 154(b) by 347 days.

(21) Appl. No.: 14/523,050

(22) Filed: Oct. 24, 2014

(65) Prior Publication Data

US 2015/0231724 A1 Aug. 20, 2015

Related U.S. Application Data

(60) Provisional application No. 61/940,633, filed on Feb. 17, 2014.

(51) Int. Cl.
*B23K 10/00* (2006.01)
*B23K 26/38* (2014.01)
(Continued)

(52) U.S. Cl.
CPC .............. *B23K 7/10* (2013.01); *B23K 7/002* (2013.01); *B23K 10/00* (2013.01); *B23K 26/38* (2013.01); *B26F 3/004* (2013.01); *Y10T 83/364* (2015.04)

(58) Field of Classification Search
CPC ........ B23K 10/00; B23K 26/38; B23K 7/002; B23K 7/10; B26F 3/004; Y10T 83/364
(Continued)

(56) References Cited

U.S. PATENT DOCUMENTS 5,893,986 A 4/1999 Oakley et al.
6,772,040 B1 * 8/2004 Picard ................ H05H 1/36
219/121.11

(Continued)

FOREIGN PATENT DOCUMENTS

EP 0591527 4/1994
JP 05212546 8/1993
JP 06278060 4/1994

OTHER PUBLICATIONS

PCT/IB2015/000183—International Search Report and Written Opinion of the International Searching Authority dated Jul. 23, 2015.

*Primary Examiner* — Roy King
*Assistant Examiner* — Michael Aboagye

(57) ABSTRACT

The system and method described herein generally pertains to generating a lead in profile that defines acceleration before a cutting velocity is achieved to perform a cutting operation and a lead out profile that defines deceleration after the cutting operation is performed. The lead in profile defines acceleration from approximately zero (0) to the cutting velocity within a duration of time in order to perform the cutting operation, wherein the lead in profile is calculated based on the cutting velocity or a type of material of the workpiece, a start location for the cutting operation, and a thickness of the workpiece. The lead out profile defines deceleration from the cutting operation to approximately zero (0) within a duration of time, wherein the lead out profile is calculated based on the cutting velocity or a type of material of the workpiece, an end location for the cutting operation, and a thickness of the workpiece.

20 Claims, 8 Drawing Sheets

(51) Int. Cl.
  *B23K 7/10*   (2006.01)
  *B26F 3/00*   (2006.01)
  *B23K 7/00*   (2006.01)

(58) Field of Classification Search
  USPC ............ 266/58, 77, 67, 48, 65; 219/121.36,
         219/121.67, 121.39; 83/177, 862
  See application file for complete search history.

(56) References Cited

U.S. PATENT DOCUMENTS

| | | | |
|---|---|---|---|
| 7,015,416 B2 | 3/2006 | Delzenne | |
| 7,087,855 B2 * | 8/2006 | Yamaguchi | B23K 10/006 |
| | | | 219/121.39 |
| 8,338,739 B2 * | 12/2012 | Lindsay | B23K 31/10 |
| | | | 219/121.39 |
| 8,423,172 B2 | 4/2013 | Erichsen et al. | |
| 2014/0060271 A1 | 3/2014 | Norberg Ohlsson | |

* cited by examiner

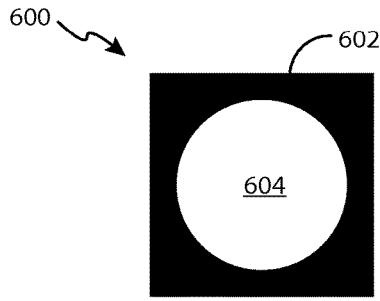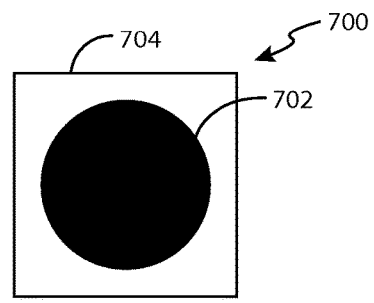
FIG. 6  FIG. 7
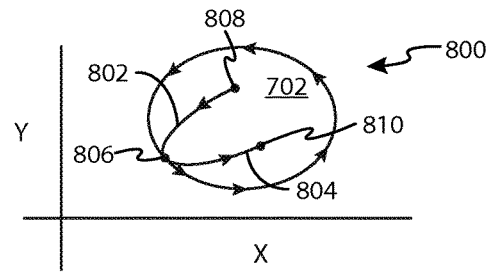
FIG. 8
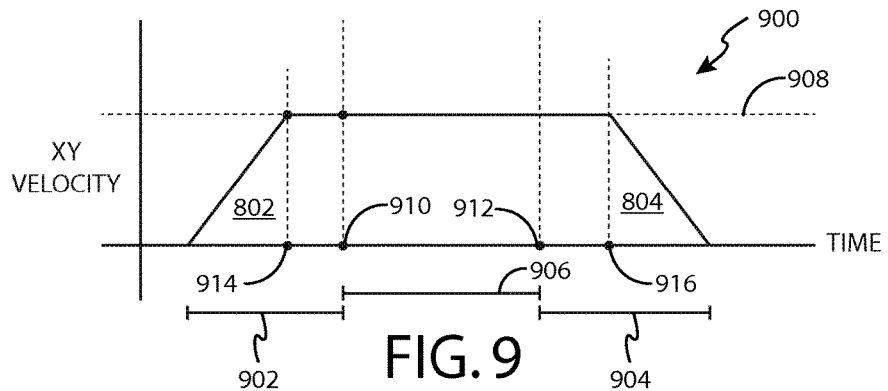
FIG. 9
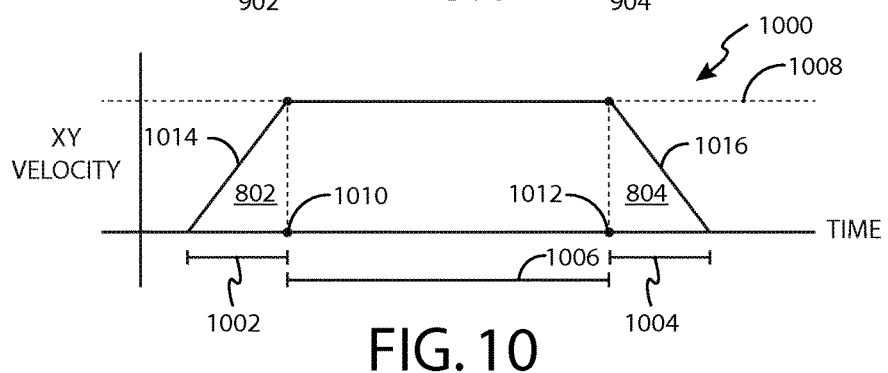
FIG. 10

SYSTEM AND METHOD FOR MULTIVERSE CONTROLS

PRIORITY

This application claims the benefit of priority to U.S. Provisional Application Ser. No. 61/940,633, filed Feb. 17, 2014, and entitled "SYSTEM AND METHOD FOR MULTIVERSE CONTROLS." The entirety of the aforementioned application is incorporated herein by reference.

TECHNICAL FIELD

In general, the present invention relates to a system that cuts a workpiece. More particularly, the present invention relates to calculating a lead in profile and/or a lead out profile that is used to control a velocity of an implement during a cutting operation.

BACKGROUND OF THE INVENTION

Systems can be used to cut or mark a workpiece that has a thickness and is composed of a type of material such as steel, metal, aluminum, among others. Generally, a cutting operation is cutting completely through the workpiece and a marking operation is marking a surface of the workpiece. Such systems can include, laser cutting systems, waterjet cutting systems, automated cutting systems, plasma cutting systems, among others.

Laser cutting systems uses a laser to cut materials. A laser cutting system directing a laser at the workpiece to be cut or marked. The workpiece can be either melt, burned, vaporized away, or is blown away by a jet of gas, leaving a high-quality surface and clean edge. For instance, laser cutting systems can be used to cut or mark flat-sheet material as well as structural and piping materials.

Waterjet cutting systems uses high-pressure jet of water, or a mixture of water and an abrasive substance to cut or mark a workpiece. Waterjet cutting systems can cut or mark materials such as metal or granite (using a mixture of water and an abrasive substance) and rubber or wood (using water without an abrasive substance).

Plasma cutting tools used to cut or otherwise operate on a workpiece typically comprise a gas nozzle with an electrode therein. Generally, plasma tools direct gas through a nozzle toward the workpiece, with some or all the gas ionized in a plasma arc between the electrode and the workpiece. The arc is used to cut, mark or otherwise operate on the workpiece.

In most tools, a pilot arc is first established between the electrode and the nozzle. Then, the pilot arc is transferred from the nozzle to the workpiece for cutting and/or other operations. For example, some tools use contact-based starting, with the electrode and nozzle initially in contact with one another. While current is passing through the electrode and nozzle, the electrode and nozzle are moved apart to create a gap. A spark across the gap initiates the pilot arc in a successful starting operation.

Other tools use non-contact starting, which can advantageously avoid wear on the electrode that is aggravated by contact during starting and can also avoid the need to have more complexity in terms of additional moving parts to bring the nozzle and electrode into and out of contact. To initiate a plasma arc in a non-contact start, a high electric potential must be generated between the spaced apart nozzle (which acts as the anode) and the electrode (which acts as the cathode). The generated voltage must exceed the break over voltage associated with the air gap between the nozzle and electrode. The break over voltage can be influenced by factors such as distance between nozzle and electrode, type of gas present, velocity of gas flow, and nozzle and electrode geometry.

Cutting and/or marking systems can include a number of adjustments a user can adjust and what is needed is an improved technique to prevent adjustment that is detrimental to a cutting or marking operation.

SUMMARY OF THE INVENTION

In accordance with an embodiment of the present invention, a system for cutting a workpiece is provided that includes a torch, a heat source used by the torch to perform the cutting operation on the workpiece, and a controller that manages at least one of a power output to the torch, a voltage output to the torch, a current output to the torch, a heat source output to the torch. The system can further include a shape component that is configured to define a desired shape for the workpiece with one or more geometric coordinates to achieve the desired shape for the cutting operation. The system can include a lead component that is configured to generate a lead in profile having an acceleration for a duration of time and a lead out profile having a deceleration for a duration of time, wherein the lead in profile is used to control an acceleration of the torch before the cutting operation and the lead out profile is used to control a deceleration of the torch after the cutting operation. The system further includes a motion control component that is configured to control a movement of the torch with the one or more geometric coordinates and a velocity of the torch with at least the lead in profile or the lead out profile.

In accordance with an embodiment of the present invention, a system for use with a workpiece is provided that includes an implement that performs a cutting operation on a workpiece, the cutting operation including cutting completely through the workpiece and an input component that is configured to receive a thickness of the workpiece, a material type of the workpiece or a cutting velocity, a start location on the workpiece, and an end location on the workpiece. The system can include a power source that supplies a power to perform the cutting or marking of the workpiece and a controller that manages at least one of a power output to the torch, a voltage output to the torch, or a current output to the torch. The system further includes a shape component that is configured to define one or more geometric coordinates to cut the workpiece to achieve a desired shape. The system can also include a lead component that is configured to generate at least one of the following: a lead in profile based on the cutting velocity and the start location based on a cutting velocity and the start location, wherein the lead profile defines an acceleration for a duration of time prior to performing the cutting operation; and a lead out profile based on the cutting velocity and the end location, based on a cutting velocity and the start location, wherein the lead profile defines an acceleration for a duration of time prior to performing the cutting operation. The system further includes a motion control component that is configured to control motion of the implement based on the one or more geometric coordinates, the cutting velocity, and at least one of the lead in profile or the lead out profile.

In accordance with an embodiment of the present invention, a system for cutting or marking a workpiece is provided that includes at least the following: an implement that performs a cutting operation on a workpiece, the cutting operation including cutting completely through the workpiece; an input component that is configured to receive a thickness of the workpiece, a material type of the workpiece or a cutting velocity, a start location on the workpiece, and an end location on the workpiece; a power source that supplies a power to perform the cutting or marking of the workpiece; a controller that manages at least one of a power output to the torch, a voltage output to the torch, or a current output to the torch; a shape component that is configured to define one or more geometric coordinates to cut the workpiece to achieve a desired shape; a lead component that is configured to generate at least one of the following: a lead in profile based on the cutting velocity and the start location based on a cutting velocity and the start location, wherein the lead profile defines an acceleration for a duration of time prior to performing the cutting operation; a lead out profile based on the cutting velocity and the end location, based on a cutting velocity and the start location, wherein the lead profile defines an acceleration for a duration of time prior to performing the cutting operation; means for controlling a movement of the implement based on the one or more geometric coordinates; and means for controlling a velocity of the implement with the lead in profile before the cutting operation, with the cutting velocity during the cutting operation, and the lead out profile after the cutting operation.

In accordance with an embodiment of the present invention, a method is provided that includes at least the following steps: receiving a thickness of a workpiece, a type of material of the workpiece for a cutting operation, a start location for the cutting operation, and an end location for the cutting operation; identifying a cutting velocity based on the type of material of the workpiece; calculating a lead in profile for the cutting operation based on the start location for the cutting operation and the cutting velocity; calculating a lead out profile for the cutting operation based on the end location for the cutting operation and the cutting velocity; utilizing the lead in profile to increase a velocity of an implement before the cutting operation; cutting the workpiece at the cutting velocity during the cutting operation with the implement; and utilizing the lead out profile to reduce the velocity of the implement after the cutting operation.

The subject innovation also encompasses the ability to calculate the lead in/out profiles statically before the part starts to be cut or can be calculated on the fly during cutting. Should the user change the cut speed during cutting then this will effect subsequent lead in/out geometric profiles.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 6 illustrates a desired workpiece that is created with an external cut as an end location for the cutting operation;

FIG. 7 illustrates a desired workpiece that is created with an internal cut as an end location for the cutting operation;

FIG. 8 is graph illustrating geometric coordinates on a workpiece for a cutting operation;

FIG. 9 is graph illustrating manually controlled velocity of an implement that performs a cutting operation;

FIG. 10 is graph illustrating automatically controlled velocity of an implement that performs a cutting operation;

DETAILED DESCRIPTION OF THE INVENTION

Figure 1:
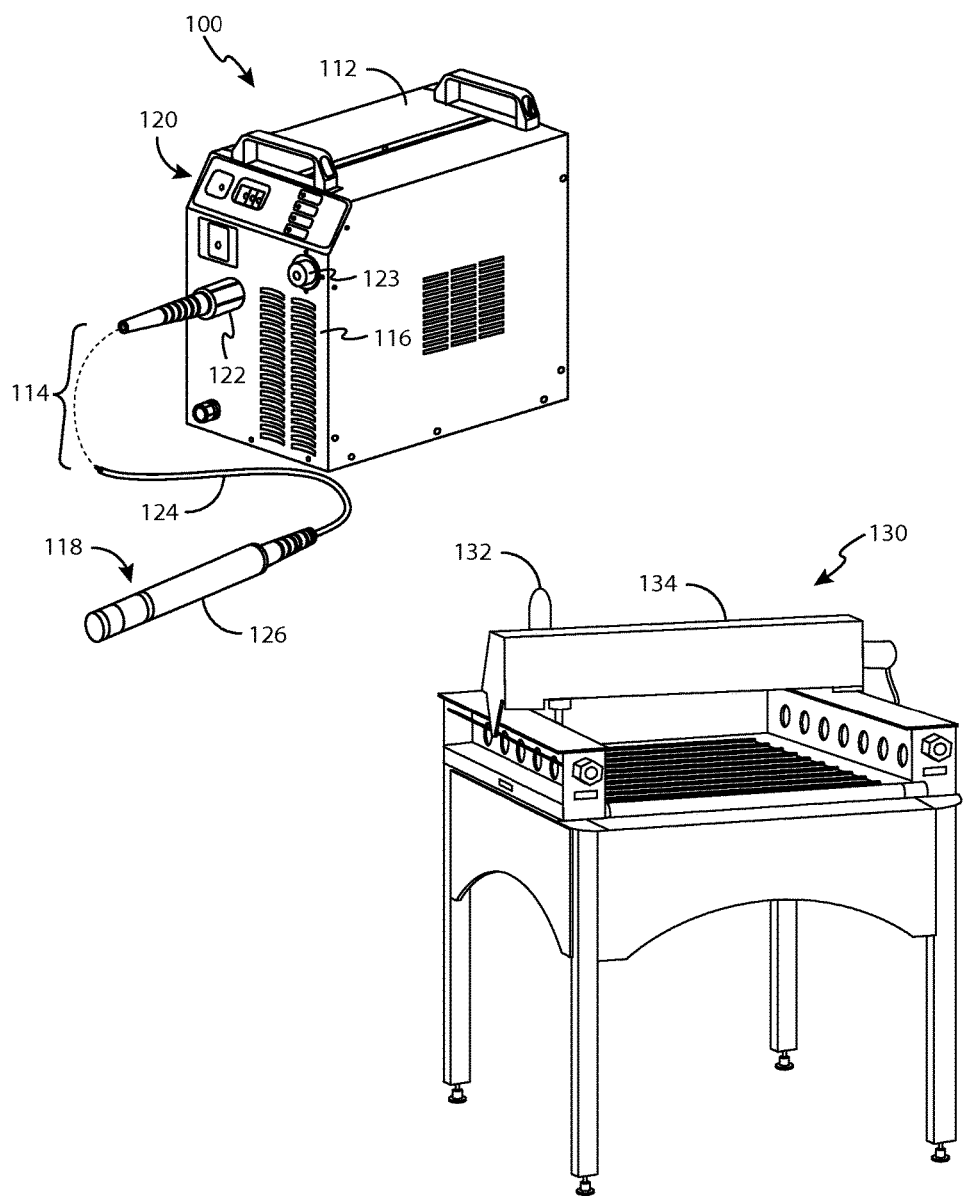
FIG. 1 illustrates a perspective view of a cutting system.

Embodiments of the invention relate to methods and systems that relate to generating a lead in profile (e.g., also referred to as a lead in geometric profile) that defines acceleration before a cutting velocity is achieved to perform a cutting operation and a lead out profile (e.g., also referred to as a lead out geometric profile) that defines deceleration after the cutting operation is performed on a workpiece (e.g., a completed workpiece where completion is based on the cutting operation being completed). The lead in profile defines acceleration from approximately zero (0) velocity to the cutting velocity within a duration of time in order to reach cut velocity to perform the cutting operation, wherein the lead in profile is calculated based on the cutting velocity and/or a type of material of the workpiece, a start location (e.g., a location where a first movement of the cutting operation begins) for the cutting operation, and a thickness of the workpiece. The lead in profile allows the cutting velocity to be reached within a defined duration of time and distance which corresponds to a location at which a non-scrap edge is created for the desired workpiece. The lead out profile defines deceleration from the cutting operation to approximately zero (0) velocity within a duration of time, wherein the lead out profile is calculated based on the cutting velocity and/or a type of material of the workpiece, an end location for the cutting operation (e.g., a location where a last movement of the cutting operation ends), and a thickness of the workpiece. The lead out profile allows the cutting velocity to be decelerated to approximately zero within a defined duration of time and distance which corresponds to a location at which the cutting operation is complete and the desired workpiece is created. In an embodiment, the lead in profile and the lead out profile can be a portion of machine readable instructions that can be, for example, utilized and/or incorporated with a portion of machine readable instructions related to movement control via geometric coordinates.

The subject innovation can be utilized statically before a cutting operation is performed, during a cutting operation (e.g., "on-the-fly"), and/or a combination thereof. For instance, the subject innovation can change lead in/out due to input changes such as a user input (e.g., overriding a velocity to scale up or down and the user being able to override to scale the lead lengths up or down dynamically whilst cutting).

"Cut," "cutting," "mark," or "marking" as used herein including any other formatives of these words will refer to cutting completely through a workpiece or surface marking a workpiece which can include, but is not limited to including, plasma cutting, plasma marking, laser cutting, laser marking, waterjet cutting, waterjet marking, routing, milling, grinding, or any implement that can cut or mark a workpiece. Further, the control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit of scope of the above discussed inventions. The embodiments and discussions herein can be readily incorporated into any of these systems and methodologies by those skilled in the art.

A portion of "scrap" as used herein is a remaining unwanted portion of a workpiece after a cutting or marking operation is performed. In particular, a cutting operation performs a separation of a portion of the workpiece that creates a scrap edge and a scrap edge in comparison to the desired workpiece that includes a scrap edge and a non-scrap edge.

A "desired workpiece" as used herein is a remaining portion of a workpiece after a cutting or marking operation is performed. In particular, a cutting operation performs a separation of a portion of the workpiece that creates a scrap edge and a non-scrap edge, wherein the non-scrap edge is an edge of the desired workpiece. In an embodiment, a desired workpiece can be cut having a start time and an end time during the cutting operation, wherein the cutting operation between the start time and the end time includes a cutting velocity and one or more geometric coordinates (e.g., x axis, y axis, and/or z axis). During the cutting operation to create the desired workpiece, a non-scrap edge on the workpiece is created by the cutting operation. It follows that a scrap edge is also created during the cutting operation but is on a portion of scrap. Before the start time of the cutting operation, a lead in is used. After the end time of the cutting operation, a lead out is used.

A "lead in" as used herein is an additional distance (and an amount of time) to allow the implement to accelerate up to a cutting velocity before performing the cutting operation on the workpiece to achieve the desired workpiece. In an embodiment, the lead in is performed on a portion of scrap before a location of where the desired workpiece is to start.

A "lead out" as used herein is an additional distance (and an amount of time) to allow the implement to decelerate from the cutting velocity after performing the cutting operation on the workpiece to achieve the desired workpiece. In an embodiment, the lead out is performed on a portion of scrap after a location of where the desired workpiece is to end.

As used herein, "x axis" is defined as an axis that coincides with a longitudinal axis of a cutting table that supports a workpiece. As used herein, "y axis" is defined as an axis that coincides with a latitudinal axis of a cutting table that supports a workpiece. As used herein, "z axis" is defined as an axis that coincides with a distance (e.g., a height) of a torch from the workpiece and/or cutting table.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 1-4 illustrate cutting systems that is used with an automated or semi-automated systems to cut or mark a workpiece. It is to be appreciated that the subject innovation can be used with any cutting system that cuts through a workpiece or marks a surface of the workpiece. Moreover, the subject innovation can be used with any motion controller that provides geometric coordinates to control a movement in 2D (e.g., x and y axis) or 3D (x, y, and z axis) space for an implement that performs the cutting operation or marking operation. The term "cutting operation" as used herein can be defined as cutting through a workpiece or marking a surface of the workpiece. The subject innovation will work with any number of coordinated axis. In particular, the subject innovation can be used with bevel heads which may have A, B, and/or C axis which allow to keep the cutting device perpendicular to the workpiece whilst creating an angle along an edge of the workpiece.

FIG. 1 illustrates one example of a cutting system 100 that performs a plasma cutting operation. It is to be appreciated that the subject innovation can be utilized with any suitable cutting system that performs a cutting, a marking, a routing, and the like and plasma cutting is solely used for example. Other plasma arc torch systems of different configurations may be used with the present invention as well.

As shown, system 100 includes a control unit having a housing 112 with a connected torch 114. Housing 112 includes various components for controlling a plasma arc, such as a power supply, a plasma starting circuit, air regulators, input and output electrical and gas connectors, controllers, etc. (discussed in FIG. 2). Torch 114 is attached to a front side 116 of housing. Torch 114 includes within it electrical connectors to connect an electrode and a nozzle within the torch end 118 to electrical connectors within housing 112. Separate electrical pathways may be provided for a pilot arc and a working arc, with switching elements provided within housing 112. A gas conduit is also present within torch 114 to transfer the gas that becomes the plasma arc to the torch tip. Input component 120 can receive a user input. In an embodiment, input component 120 may be provided on housing 112 (as illustrated), along with various electrical and gas connectors. For instance, the input component can be, but is not limited to, buttons, switches, touch screen, voice command, microphone for audio input, camera for gesture control input, among others.

It should be understood that the housing 112 illustrated in FIG. 1 is but a single example that could employ aspects of the inventive the concepts disclosed herein. Accordingly, the general disclosure and description above should not be considered limiting in any way as to the types or sizes of plasma arc systems that could employ the disclosed elements. Particular components and controls will be discussed in detail below with reference to FIG. 2.

As shown in FIG. 1, torch 114 includes a connector 122 at one end for attaching to a mating connector 123 of housing 112. When connected in such way, the various electrical and gas passageways through the hose portion 124 of torch 114 are connected so as to place the relevant portions of torch body 126 in connection with the relevant portions within housing 112.

In an embodiment, the cutting system 100 can be utilized with a support 130 that facilitates automation of the cutting operation. For instance, the support 130 can be a structure on which the workpiece is placed. In a particular embodiment, support 130 can be a cutting table and gantry 134 can be used with at least torch 114. Support 130 can include components that provide motion to at least one of the torch 114 about the workpiece W or the workpiece W about the torch 114. In an embodiment, a motion controller (not shown) can be utilized to provide motion to at least one of the workpiece W or torch to perform the cutting operation to achieve the desired workpiece. For example, the motion controller can be incorporated into cutting system 100, into support 130, a stand-alone component, or a combination thereof. In an embodiment, a portion of torch 114 can be inserted into holder 132 to perform an automated or semi-automated cutting operation. For instance, controls used by the cutting system 100 and support 130 can be machine readable instructions to achieve the desired workpiece from the cutting operation. The support 130 is illustrated for example and any suitable support 130 can be chosen with sound engineering judgment without departing from the intended scope of embodiments of the subject innovation.

Figure 2:
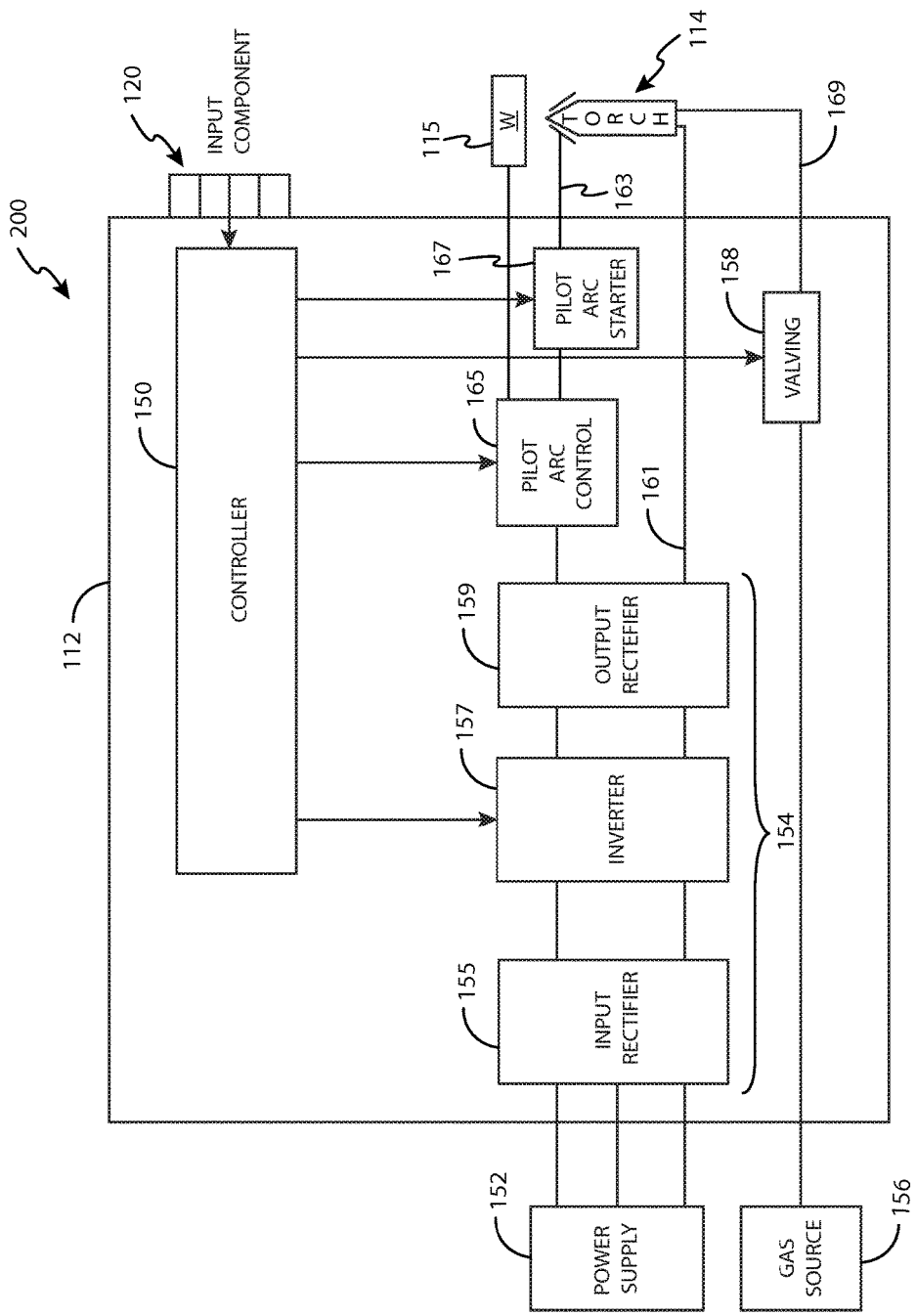
FIG. 2 illustrates a control system of a cutting system.

FIG. 2 illustrates a plasma arc cutting control system 200 that can be utilized with aspects of the subject innovation. As shown, cutting system 200 includes housing 112 and torch 114, as mentioned above. Element 115 represents workpiece W being cut or marked. A controller 150 is provided within housing 112 to control various aspects of the cutting control system 200 and/or cutting system 100. Accordingly, controller 150 could comprise a digital signal processor, microprocessor, programmable gate array control or the like, a memory, and control software. Controller 150 can direct operation of the cutting system 100. Additionally, a motion controller (not shown) can be utilized with cutting control system 200 to provide velocity and geometric coordinates to actuate torch 114 about a workpiece. Alternatively, the motion controller can be utilized with cutting control system 200 to provide velocity and geometric coordinates to actuate a workpiece about torch 114.

A power supply 152 is connected to an inverter power control circuit 154 the output of which helps provide fast response for the control of plasma current in use. As shown, circuit 154 may include an input rectifier 155, an inverter 157, and an output rectifier 159. The output 161 of circuit 154 provides a DC signal to torch 114 that can be delivered at a first level (such as 10 A) for marking and a second level (such as 100 A) for cutting. Controller 150 directs circuit 154 to provide the desired output based on input given by a user via input devices 120. For starting torch 114, controller 150 can direct a pilot arc 163 be generated via a pilot arc control 165 and a pilot arc starter 167.

A gas source 156 is provided to housing 112 with gas pressure and flow control means such as valving 158 controlled by controller 150 to provide a gas flow 169 desired for either marking or cutting. If desired, such valving could incorporate pulse width modulation.

Figure 3:
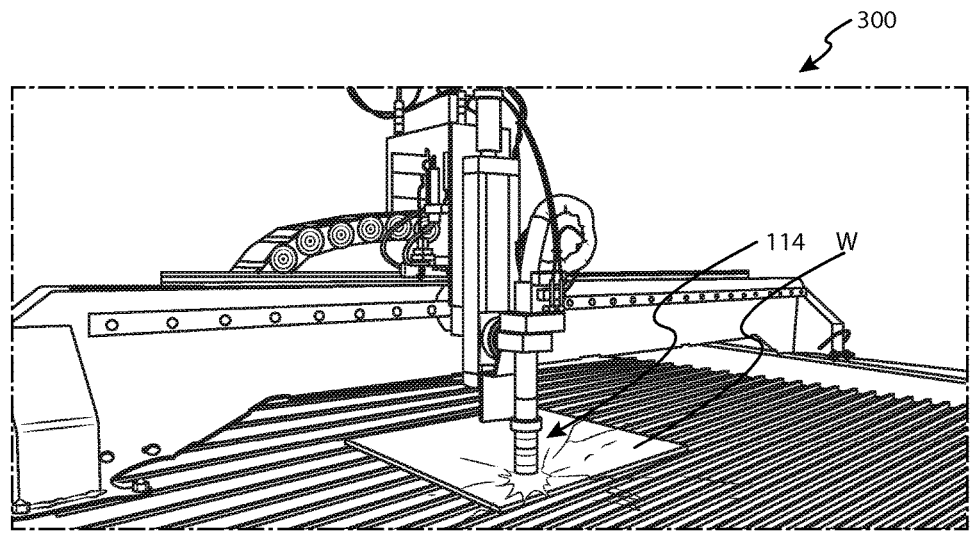
FIG. 3 illustrates a perspective view of a computer numeric control cutting system.
Figure 4:
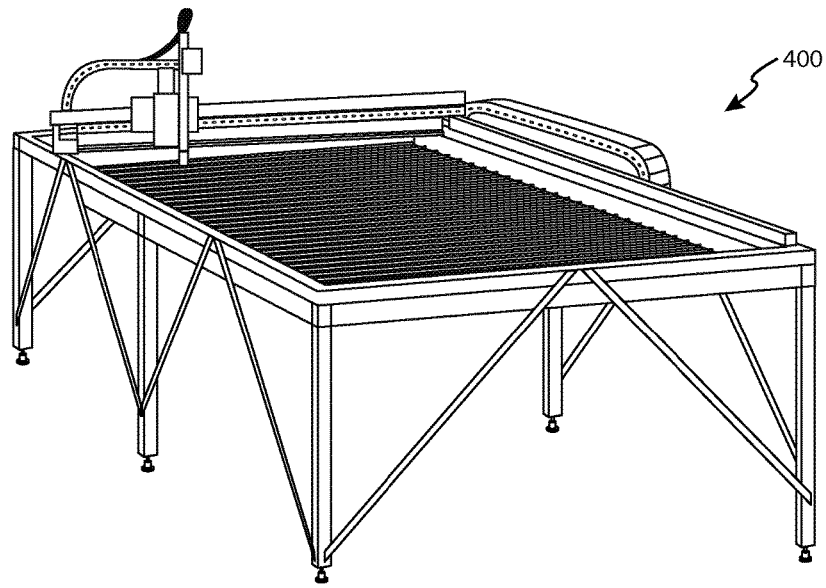
FIG. 4 illustrates a perspective view of a computer numeric control cutting system.

FIGS. 3 and 4 illustrate exemplary cutting systems. FIG. 3 illustrates a cutting system 300 that performs a plasma cutting operation in an automated environment. FIG. 4 illustrates a cutting system 400 that performs a cutting operation with automation in a more portable configuration. Both cutting systems 300 and 400 can be a computer numeric control (CNC) cutting system that provides automated control to perform a cutting operation via machine readable instructions. It is to be appreciated that cutting system 300 in FIG. 3 and cutting system 400 in FIG. 4 are not to be limiting on the subject innovation but solely for example.

Cutting systems 300 and 400 perform automated cutting operations with machine readable instructions that include one or more geometric coordinates (e.g., x axis, y axis, and z axis) and a cutting velocity to use while creating a non-scrap edge on the desired workpiece.

Conventional control of cutting systems require manual control for a lead in before performing a cutting operation and a lead out after performing the cutting operation. The number of adjustments required by a user often lead to inefficiencies and inaccuracies. Moreover, user controlled lead in and/or lead out can lead to increased cycle times to perform the cutting operation for the desired workpiece. For example, a lead in and/or a lead out that is performed manually can be too short of an additional distance which results in the implement not reaching the cutting velocity at a start of the cutting operation on a non-scrap edge of the desired workpiece. In another example, a lead in and/or lead out that is performed manually and too long, the implement achieves the cutting velocity but is running at such cutting velocity for a longer than needed time which wastes consumed materials. These, among other miscalculations, can lead to an unnecessary increase in cycle times and inaccurate desired workpieces.

Figure 5:
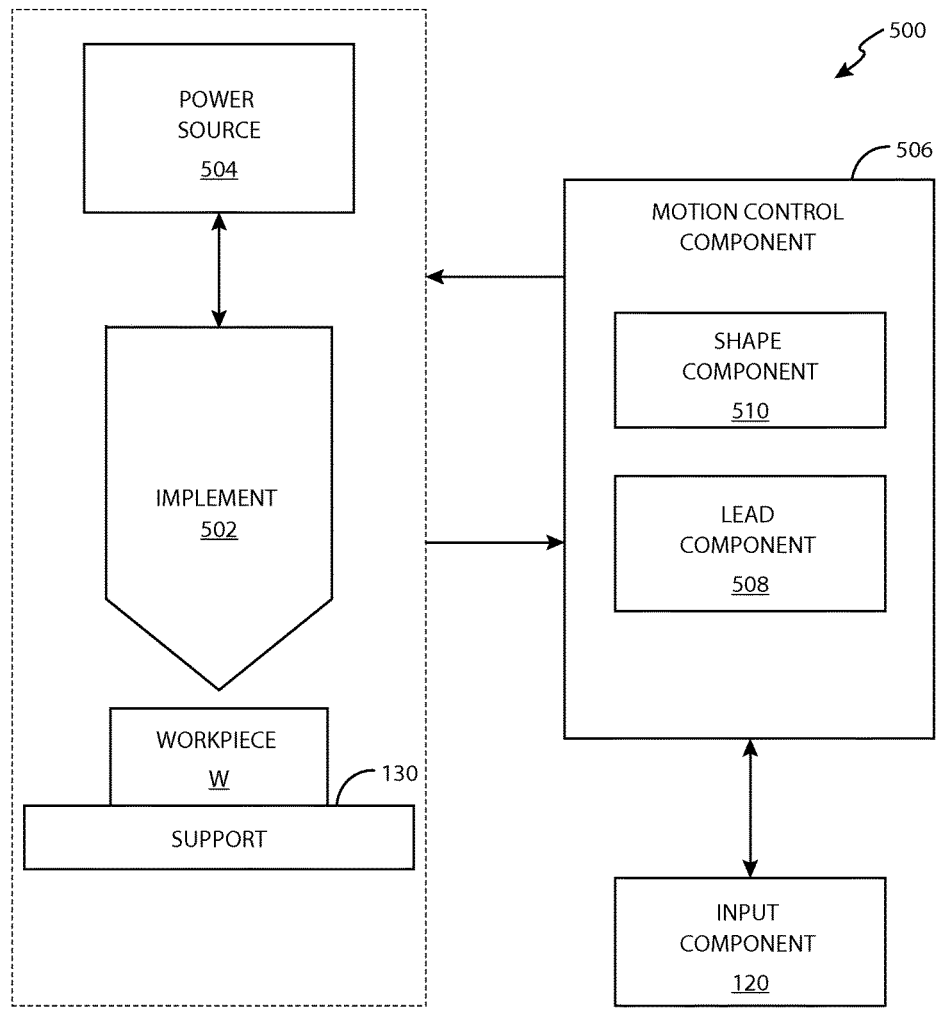
FIG. 5 illustrates a cutting system that automatically calculates a velocity of an implement during a cutting operation.

FIG. 5 illustrates a cutting system 500 that creates a lead in profile and/or a lead out profile for use with a cutting operation on workpiece W. Cutting system 500 can include implement 502 that performs a cutting operation on workpiece W which is supported by support 130. In a particular embodiment, support 130 can be a cutting table and a gantry can be used with at least implement 502. By way of example and not limitation, implement 502 can be a torch, a routing blade, a tool, a cutting tool, a blade, a welder, an implement used with a plasma cutting or marking operation, an implement used with a laser cutting or marking operation, an implement used with a waterjet cutting or marking operation, and the like. Power source 504 can supply a portion of power to perform the cutting operation with a cutting or marking technique (e.g., plasma, waterjet, laser, routing, among others). For instance, in a plasma cutting technique, power source 504 can supply power for at least one of motion of implement 502, control of the plasma cutting operation, control of supply of a gas, a voltage output to implement 502, a current output to implement 502, a heat source output to implement 502, and the like.

Cutting system 500 further includes motion control component 506 that manages a motion and/or a velocity during the cutting operation. In an embodiment, motion control component 506 manages a motion and/or a velocity of workpiece W. In another embodiment, motion control component 506 manages a motion and/or a velocity of implement 502. In still another embodiment, motion controller component 506 manages a motion and/or a velocity of implement 502 and workpiece W.

Motion control component 506 can be configured to calculate and communicate an instruction related to a geometric coordinate to perform the cutting operation. For example, to achieve a desired workpiece, the cutting operation is to be performed with a particular pattern, shape, or dimension, wherein the desired workpiece is defined with one or more geometric coordinates. Moreover, to achieve the desired workpiece upon completion of the cutting operation, a cutting velocity is defined at which to maintain during the cutting operation (e.g., from a start point to an end point). For a cutting operation to achieve the desired workpiece, a lead in and a lead out is used with the cutting operation. The cutting operation can include a cutting profile that is defined as one or more geometric coordinates related to the desired workpiece and a cutting velocity to perform the cutting operation. For example, the cutting profile can include geometric coordinates from a start of the cutting operation through to the end of the cutting operation, wherein geometric coordinates define a start location of a first movement of cutting system 500, an end location of the last movement of cutting system 500, a start point where a non-scrap edge is created during the cutting operation, an end point were the last non-scrap edge is created, among others. The cutting profile defines movement from the start location of the cutting operation to the end location of the cutting operation. The cutting profile utilizes the cutting velocity between the start point and the end point to create the desired workpiece. By way of example and not limitation, the cutting profile can be machine readable instructions, a portion of a program, a portion of computer code, a set of instructions, a portion of data that can be compiled into a program, and the like.

Motion control component 506 can include shape component 510 that is configured to define one or more geometric coordinates for the desired workpiece that is created from the cutting operation. The one or more geometric coordinates for the desired workpiece can relate to at least one of an x axis, a y axis, and/or a z axis. Shape component 510 can be a feature configured to receive the one or more coordinates via a user, a computer, a data base, a network, a server, among others. In an embodiment, shape component 510 can be configured to create a portion of the cutting profile. In an example, a user can create a cutting profile. In another example, a cutting profile can be stored upon completion and accessed for use with a cutting operation performed at a later time. In still another example, a user can utilize shape component 510 to access a cutting profile and edit such cutting profile to tailor for a desired workpiece. It is to be appreciated that the cutting profiles, geometric coordinates, and the like can be created, received, and/or accessed via at least one of motion control component 506, shape component 510, a network, a server, the Internet, a data base, a harddrive, a memory, an external harddrive, a computer, and the like.

Motion control component 506 can include lead component 508 that is configured to generate a lead in profile and/or a lead out profile. Lead component 508 can calculate the lead in profile based on at least one of a type of material of workpiece W, a cutting velocity, a start location of a first movement of the cutting operation, a geometric coordinate for the desired workpiece, among others. In an embodiment, a cutting velocity can be determined from a type of material of workpiece W and/or a thickness of workpiece W. A lead in for cutting system 500 is an additional distance and an amount of time to allow implement 502 to accelerate up to a cutting velocity before performing the cutting operation on the workpiece to achieve the desired workpiece. Lead component 508 creates the lead in profile to define a velocity waveform that allows the cutting velocity to be reached at a point in which the cutting operation begins (e.g., the start point of the cutting operation) During the cutting operation, the cutting velocity is maintained until the desired workpiece is created and an end point of the cutting operation is reached. Motion control component 506 utilizes the lead in profile in combination with the cutting profile to manage movement of implement 502 (or workpiece W), velocity of implement 502 (or workpiece W) before the start point of the cutting operation and during the cutting operation.

Lead component 508 can calculate the lead out profile based on at least one of a type of material of workpiece W, a cutting velocity, an end location of a last movement of the cutting operation, a geometric coordinate for the desired workpiece, among others. In an embodiment, a cutting velocity can be determined from a type of material of workpiece W and/or a thickness of workpiece W. A lead out for cutting system 500 is an additional distance and an amount of time to allow implement 502 to decelerate from the cutting velocity after performing the cutting operation on the workpiece to achieve the desired workpiece. Lead component 508 creates the lead out profile to define a velocity waveform that allows deceleration of the cutting velocity at a point in which the cutting operation is complete (e.g., the end point of the cutting operation). Upon completion of the cutting operation, the cutting velocity is reduced from the end point of the cutting operation to the end location. Motion control component 506 utilizes the lead out profile in combination with the cutting profile to manage movement of implement 502 (or workpiece W), velocity of implement 502 (or workpiece W) during the cutting operation and after the end point of the cutting operation.

It is to be appreciated that lead component 508 can be configured to generate the lead in profile as a first set of machine readable instructions and the lead out profile as a second set of machine readable instructions. Moreover, as discussed above, the cutting profile can be a set of machine readable instructions that are utilized by a component to perform the cutting operation with cutting system 500. Motion control component 506 can utilize the set of machine readable instructions (corresponding to the cutting profile), the first set of machine readable instructions (corresponding to the lead in profile), and the second set of machine readable instructions (corresponding to the lead out profile) to control movement of the cutting operation, the cutting velocity, the acceleration to reach the cutting velocity, the deceleration to reduce the cutting velocity, and the like.

As discussed above, the lead in profile can be created based on a thickness of workpiece W, a material type of workpiece W or a cutting velocity, and a start location (where a first movement begins during the cutting operation) on the workpiece. For instance, a lead in profile can be created from a thickness of workpiece W, a material type of workpiece W, and a start location. In another instance, the lead in profile can be created from a thickness of workpiece W, a cutting velocity, and a start location. As discussed above, a cutting velocity can be identified based on a type of material of a workpiece. Additionally, the lead out profile can be created based on a thickness of workpiece W, a material type of workpiece W or a cutting velocity, and an end location (where a last movement occurs for the cutting operation) on the workpiece. For instance, a lead out profile can be created from a thickness of workpiece W, a material type of workpiece W, and an end location. In another instance, the lead out profile can be created from a thickness of workpiece W, a cutting velocity, and an end location.

Input component 120 is included with cutting system 500 and can be configured to receive one or more inputs. For instance, input component 120 can receive at least one of a thickness of the workpiece, a material type of the workpiece or a cutting velocity, a start location on the workpiece, or an end location on the workpiece. In an embodiment, input component 120 can receive a user input and/or an electronic signal representative of the user input. Further, input component 120 can communicate the user input and/or electronic signal representative of the user input.

It is to be appreciated that implement 502 can communicate with cutting system 500 with a wireless signal, a wired signal, or a combination thereof. Further, it is to be appreciated that input component 120 can be a stand-alone component (as depicted), incorporated into motion control component 506, or a combination thereof. Input component 120 can communicate data representative of a user input to cutting system 500 with a wired signal, wireless signal, or a combination thereof. For example, input component 120 can be, but is not limited to being, a pendant, a controller, and the like. In such example, the pendant or the controller can be a wireless connection or a wired connection to communicate with cutting system 500. It is to be appreciated that input component 120 can transmit and/or receive data to and from cutting system 500 via wired connection, a wireless connection, and/or a combination thereof.

In another embodiment, lead component 508 can be configured to dynamically adjust at least one of the lead in profile or the lead out profile based on a change in a cutting parameter, wherein the cutting parameter can be, but is not limited to, a voltage, a current, a power, a cutting velocity, a portion of the cutting profile, one or more geometric coordinates, a thickness of workpiece, a shape of the desired workpiece, a dimension of the desired workpiece, a type of cutting operation (e.g., a marking, a cutting, among others), a distance available for a lead in, a distance available for a lead out, an amount of time available for a lead in, an amount of time available for a lead out, an amount of consumable for the cutting operation (e.g., power, gas source, electrode, among others), a desired cycle time to perform the cutting operation, among others.

In still another embodiment, lead component 508 can be configured to compensate for the existence or non-existence of inertia in creating at least one of the lead in profile and/or the lead out profile. For example, during acceleration inertia is working against the cutting operation, whereas in deceleration inertia is working with the cutting operation. Thus, the cutting operation can typically decelerate at a higher rate at a shorter distance to reach a lower velocity or zero velocity (compared to the distance needed for acceleration to the cutting velocity).

A start location of a cutting operation and an end location of a cutting operation is further illustrated in FIG. 6 and FIG. 7. FIG. 6 illustrates workpiece 600 that is a desired workpiece from the cutting operation that has a start location (and end location) that is external. In this embodiment, the cut on workpiece 600 and the desired workpiece can be referred to as a contour. In particular, scrap 602 is a square shape with a circle cut out and desired workpiece 604 is a circle. In this example, a start location (e.g., where a first movement of the cutting operation begins) will be external to allow the lead in to occur on scrap 602. Moreover, an end location (e.g., where a last movement of the cutting operation occurs) will be external to allow the lead out to occur on scrap 602.

FIG. 7 illustrates workpiece 700 that is a desired workpiece from the cutting operation that has a start location (and end location) that is internal. In this embodiment, the cut on workpiece 700 and the desired workpiece can be referred to as a hole. In particular, scrap 702 is a circle shape and desired workpiece 704 is a square shape with a circle cut out. In this example, a start location (e.g., where a first movement of the cutting operation begins) will be internal to allow the lead in to occur on scrap 702. Moreover, an end location (e.g., where a last movement of the cutting operation occurs) will be internal to allow the lead out to occur on scrap 702. This is desired workpiece 700 is further utilized as an example for FIGS. 8 and 10.

Turning to FIG. 8, graph 800 illustrates geometric coordinates for a cutting operation that has a start location that is internal. In particular, graph 800 illustrates geometric coordinates to create the desired workpiece illustrated in FIG. 7 (e.g., a square with a circle cut out as the desired workpiece and a circle as scrap). The start location is internal and begins on scrap which also allows the lead in to be performed on scrap. In general, the lead in and the lead out are performed on a scrap of workpiece W. It is to be appreciated that for the sake of brevity, the z axis (e.g., height in this example) coordinates not illustrated as such coordinate can be constant. Moreover, it is to be appreciated that a non-static height or thickness of workpiece W can be considered within the scope of the subject innovation and calculating a lead in profile and/or a lead out profile can be provided with a non-static height. Graph 800 illustrates geometric coordinates for the x axis and the y axis to achieve the desired workpiece having particular shape and/or dimensions, wherein such information can be defined in the cutting profile (discussed above).

The cutting operation is performed, in this example, in a counter-clockwise motion with lead in 802 and lead out 804. The cutting operation has point 806 which is a start point of the cutting operation and an end point of the cutting operation. After lead in 802, point 806 is when a non-scrap edge is created to achieve the desired workpiece (e.g., here, a square shape with a circle cut out). As the cutting operation travels in a counter-clockwise motion, the desired workpiece is created and the cutting operation travels towards point 806. As the cutting operation comes to completion, point 806 is reached and lead out 804 occurs. Lead in 802 is from start location 808 to point 806, wherein start location is when a motion begins for the cutting operation. Lead out 804 is from point 806 to end location 810, wherein end location is when a motion ends for the cutting operation. It is to be appreciated that, in this example, the cutting operation is performed at point 806 until it reaches back to point 806 while traveling in the counter-clockwise direction.

FIG. 9 illustrates deficiencies in a cutting operation when manual control is used for lead in and/or lead out. Graph 900 depicts velocity (y axis in Graph 900) over time (x axis in Graph 900). Lead in 802 and lead out 804 are illustrated as areas before cutting operation 906 and after cutting operation respectively. Specifically, lead in 802 occurs at duration of time 902 (and over a distance) and lead out 804 occurs at duration of time 904 (and over a distance). Moreover, cutting operation 906 is performed from start point 910 to end point 912 at cutting velocity 908.

With manual controls, lead in 802 and/or lead out 804 include inconsistencies that are detrimental to a cutting operation. In this example illustrated in graph 900 for lead in 802, cutting velocity 908 is achieved at point 914 which is earlier in time than start point 910. This is inefficient as the cutting operation is wasting consumables by running at cutting velocity 908 more than necessary for cutting operation 906. Graph 900 further depicts lead out 804 in which deceleration from cutting velocity 908 is performed at point 916, wherein point 916 is later in time than end point 912. This is inefficient as the cutting operation is wasting consumables by running at cutting velocity 908 more than necessary for cutting operation 906.

In another instance, manual control of lead in 802 can result in not reaching cutting velocity 908 before start point 910 of cutting operation 906. In still another instance, manual control of lead out 804 can result in reducing cutting velocity 908 before end point 912 of cutting operation 906. In such instances, inaccuracies can occur with the desired workpiece.

FIG. 10 illustrates graph 1000 that depicts velocity for a cutting operation in which lead in and/or lead out are calculated based on at least one of a thickness of workpiece, a material type of workpiece or a cutting velocity, a start location on the workpiece, and an end location on the workpiece in accordance with the subject innovation. Graph 1000 illustrates velocity over time. Lead in 802 is automatically calculated (via lead component discussed in FIG. 5) and a lead in profile is generated. A lead in profile can include information related to acceleration 1014 (e.g., slope) and duration of time 1002. Lead out 804 is automatically calculated (via lead component discussed in FIG. 5) and a lead out profile is generated. A lead out profile can include information related to deceleration 1016 (e.g., slope) and duration of time 1004. Cutting operation 1006 can include start point 1010 and end point 1012 that is performed at cutting velocity 1008. Further, as discussed above, cutting operation 1006 is from start point 1010 to end point 1012 and can use, for instance, a cutting profile. It is to be appreciated that the acceleration and/or the deceleration profiles may be any configuration in addition to linear such as, but not limited to, S curve, parabolic, and the like.

Automatically calculating a lead in profile for lead in 802 allows for cutting velocity 1008 to be accelerated to reach cutting velocity 1008 at start point 1010 of cutting operation 1006. Further, automatically calculating a lead out profile for lead out 804 allows for cutting velocity 1008 to be decelerated at end point 1012 of cutting velocity.

In an embodiment, the lead in profile is generated based on a cutting velocity used during the cutting operation and a start location in 2 dimensional (2D) space to create the desired shape for the workpiece; and the lead out profile is generated based on the cutting velocity used during the cutting operation, an end location in 2 dimensional (2D) space to create the desired shape for the workpiece, and an amount of inertia.

In an embodiment, the cutting of the workpiece is at least one of a plasma cutting operation or a plasma marking operation. In an embodiment, the cutting of the workpiece is at least one of a laser cutting operation or a laser marking operation. In an embodiment, the cutting of the workpiece is at least one of a waterjet cutting operation or a waterjet marking operation.

In an embodiment, the system can include a profile that defines a cutting velocity, a start time to perform the cutting operation, and an end time to terminate the cutting operation. In the embodiment, the motion control component controls movement and the velocity of the torch with the profile during the cutting operation; the motion control component controls movement and the acceleration of the torch with the lead in profile before the cutting operation to reach the cutting velocity; and the motion control component controls movement and the deceleration of the torch with the lead out profile after the cutting operation. In the embodiment, the lead in profile accelerates the torch to the cutting velocity at the start time. In the embodiment, lead out profile begins to decelerate the torch from the cutting velocity at the end time. In the embodiment, the system can include a cutting profile that includes: the profile is a first machine readable instruction; the lead in profile is a second machine readable instruction; and the lead out profile is a third machine readable instruction.

In an embodiment, the shape component receives a portion of machine readable instruction from a user to define the desired shape for the workpiece.

In an embodiment, the shape component further incorporates the lead in profile and the lead out profile to a portion of machine readable instruction associated with a profile that defines a cutting velocity, a start time to perform the cutting operation, and an end time to terminate the cutting operation. In an embodiment, the lead component dynamically adjusts at least one of the lead in profile or the lead out profile based on a real time cutting parameter associated with the cutting operation.

In an embodiment, the system can include a first set of machine readable instructions that include the one or more geometric coordinates and the cutting velocity. In an embodiment, the motion controller component appends the first set of machine readable instructions with at least one of the lead in profile or the lead out profile. In an embodiment, the cutting operation of the workpiece is at least one of a plasma cutting, a plasma marking, a waterjet cutting, a waterjet marking, a laser cutting, or a laser marking.

In an embodiment, the lead component dynamically adjusts the lead in profile based on a cutting parameter detected in real time during a time before the cutting operation, wherein the cutting parameter is at least one of the cutting velocity or the thickness of the workpiece. In an embodiment, the lead component dynamically adjusts the lead out profile based on a cutting parameter detected in real time during a time after the cutting operation, wherein the cutting parameter is at least one of the cutting velocity or the thickness of the workpiece.

Figure 11:
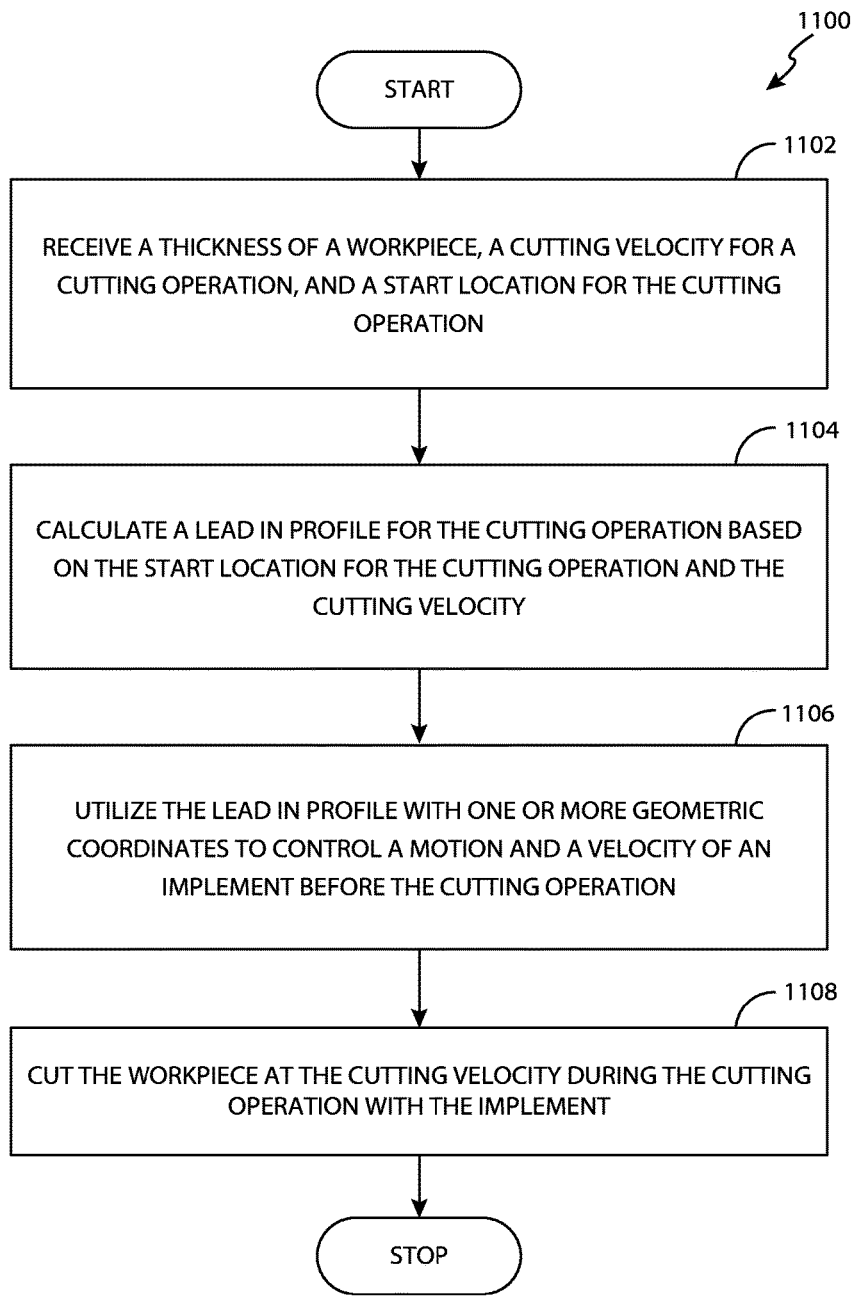
FIG. 11 is a flow diagram of generating a lead in profile for velocity of an implement for use to perform a cutting operation.
Figure 12:
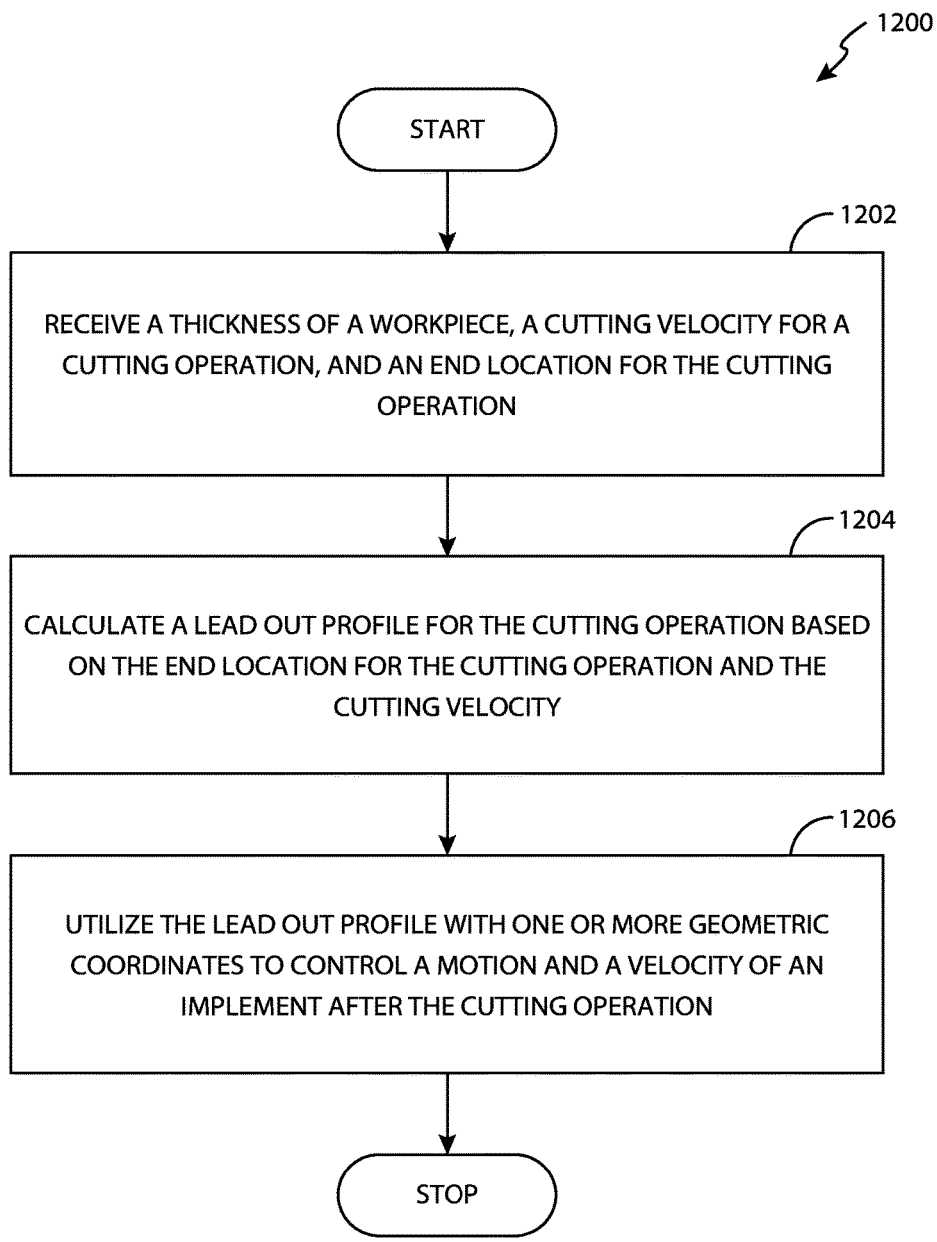
FIG. 12 is a flow diagram of generating a lead out profile for velocity of an implement for use to perform a cutting operation.
Figure 13:
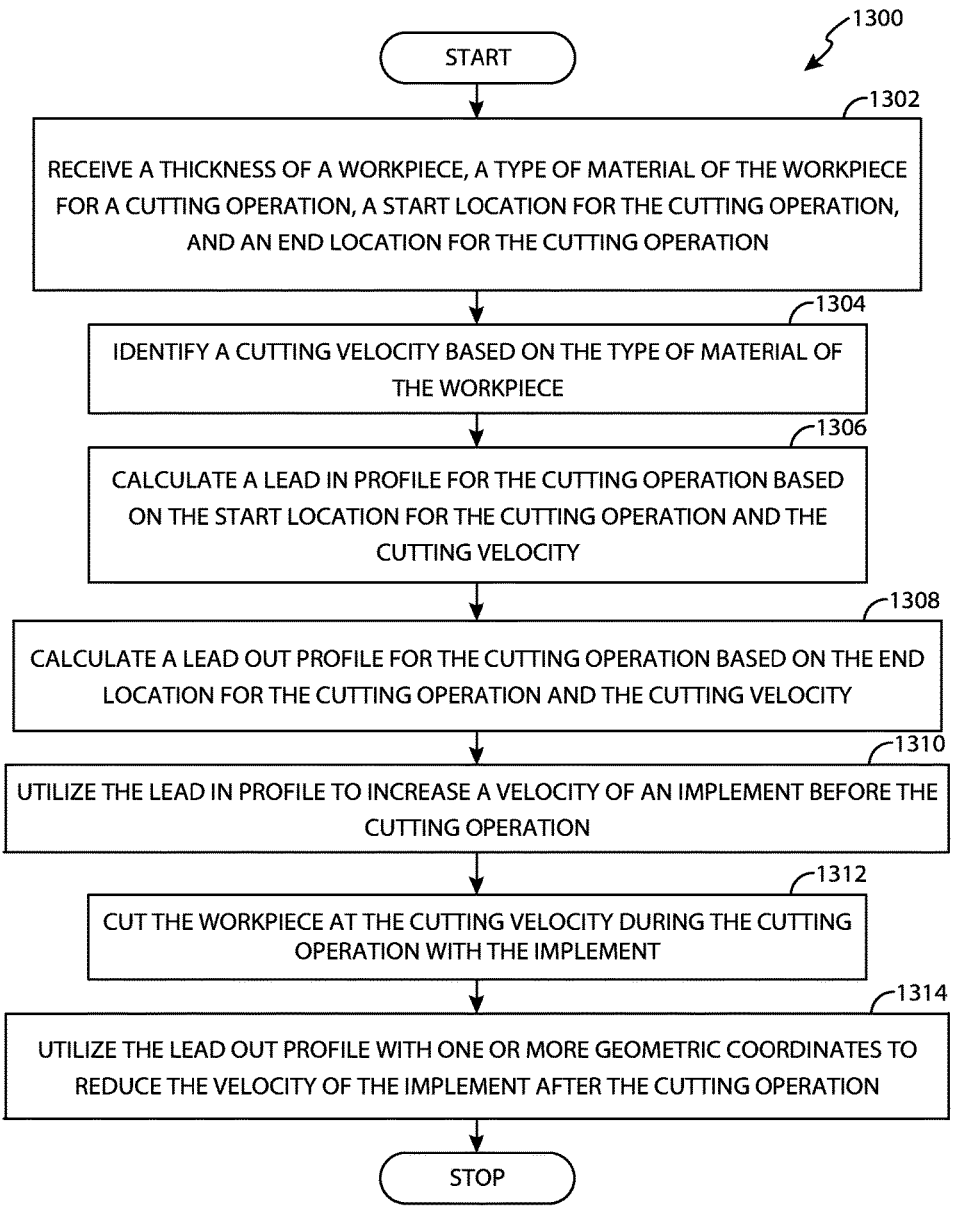
FIG. 13 is a flow diagram of generating a lead in profile and a lead out profile for a cutting operation.

In view of the exemplary devices and elements described supra, methodologies that may be implemented in accordance with the disclosed subject matter will be better appreciated with reference to the flow charts and/or methodologies of FIG. 11-13. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

FIG. 11 illustrates method 1100 that automatically calculates a lead in profile for a cutting operation, wherein the lead in profile controls a speed for a duration of time before an implement performs the cutting operation. Sequentially, the following occurs as illustrated in the decision tree flow diagram 1100 of FIG. 11 which is a flow diagram 1100 that generates the lead in profile. In an embodiment, the lead in profile can be used with a cutting operation or a marking operation in which the lead in profile can be, but is not limited to, a portion of machine readable instructions, a waveform, a portion of code, a program, among others.

A thickness of a workpiece, a cutting velocity for a cutting operation, and a start location for the cutting operation can be received (reference block 1102). A lead in profile for the cutting operation can be calculated based on the start location for the cutting operation and the cutting velocity (reference block 1104). In reference block 1104, it can be appreciated that the lead in profile can be calculated based on at least one of the start location for the cutting operation, the cutting velocity, or a material thickness. For instance, the lead in profile can include an acceleration from approximately zero (0) velocity to the cutting velocity within an amount of time, wherein the cutting velocity is achieved at the start of the cutting operation. The lead in profile can be utilized with one or more geometric coordinates to control a motion and a velocity of an implement before the cutting operation (reference block 1106). The workpiece can be cut at the cutting velocity during the cutting operation with the implement (reference block 1108).

FIG. 12 illustrates method 1200 that automatically calculates a lead out profile for a cutting operation, wherein the lead in profile controls a speed for a duration of time after an implement performs the cutting operation. Sequentially, the following occurs as illustrated in the decision tree flow diagram 1200 of FIG. 12 which is a flow diagram 1200 that generates the lead in profile. In an embodiment, the lead out profile can be used with a cutting operation or a marking operation in which the lead out profile can be, but is not limited to, a portion of machine readable instructions, a waveform, a portion of code, a program, among others.

A thickness of a workpiece, a cutting velocity for a cutting operation, and an end location for the cutting operation can be received (reference block 1202). A lead out profile for the cutting operation can be calculated based on the end location for the cutting operation and the cutting velocity (reference block 1204). In reference block 1204, it can be appreciated that the lead out profile can be calculated based on at least one of the start location for the cutting operation, the cutting velocity, or a material thickness. For instance, the lead out profile can include a deceleration from the cutting velocity to approximately zero (0) velocity within an amount of time, wherein the deceleration is initiated at the end of the cutting operation. The lead out profile can be utilized with one or more geometric coordinates to control a motion and a velocity of an implement after the cutting operation (reference block 1206). In an embodiment, the workpiece can be cut at the cutting velocity during the cutting operation with the implement before use of the lead out profile.

FIG. 13 illustrates method 1300 that automatically calculates a lead out profile for a cutting operation, wherein the lead in profile controls a speed for a duration of time after an implement performs the cutting operation. Sequentially, the following occurs as illustrated in the decision tree flow diagram 1300 of FIG. 13 which is a flow diagram 1300 that generates the lead in profile. In an embodiment, the lead out profile can be used with a cutting operation or a marking operation in which the lead out profile can be, but is not limited to, a portion of machine readable instructions, a waveform, a portion of code, a program, among others.

A thickness of a workpiece, a type of material of the workpiece for a cutting operation, a start location for the cutting operation, and an end location for the cutting operation can be received (reference block 1302). A cutting velocity can be identified based on the type of material of the workpiece (reference block 1304). A lead in profile for the cutting operation can be calculated based on the start location for the cutting operation and the cutting velocity (reference block 1306). In reference block 1306, it can be appreciated that the lead in profile can be calculated based on at least one of the start location for the cutting operation, the cutting velocity, or a material thickness. A lead out profile for the cutting operation can be calculated based on the end location for the cutting operation and the cutting velocity (reference block 1308). In reference block 1308, it can be appreciated that the lead out profile can be calculated based on at least one of the start location for the cutting operation, the cutting velocity, or a material thickness. The lead in profile can be utilized to increase a velocity of an implement before the cutting operation (reference block 1310). The workpiece can be cut or marked at the cutting velocity during the cutting operation with the implement (reference block 1312). The lead out profile can be utilized to reduce the velocity of the implement after the cutting operation (reference block 1314). In an embodiment, the lead out profile and/or the lead in profile can be utilized with a motion control component that manages velocity and movement (via one or more geometric coordinates) during the cutting operation. It is to be appreciated that the method 1300 can be employed during the cutting operation, before the cutting operation, or a combination thereof.

While the embodiments discussed herein have been related to the systems and methods discussed above, these embodiments are intended to be exemplary and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit of scope of the above discussed inventions. The embodiments and discussions herein can be readily incorporated into any of these systems and methodologies by those skilled in the art.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A system for cutting or marking a workpiece, comprising:
   a cutting tool to perform the cutting or marking operation on the workpiece;
   a shape component that is configured to generate a shape cutting profile for cutting or marking a desired shape for the workpiece, the shape cutting profile including one or more geometric coordinates to achieve the desired shape for the cutting or marking operation;
a lead component that is configured to generate a lead in profile for controlling an acceleration of the cutting tool during an acceleration time period prior to the shape cutting or marking operation and a lead out profile for controlling a deceleration of the cutting tool during a deceleration time period after the shape cutting or marking operation; and
a motion control component that is configured to control a movement of the cutting tool based on the shape cutting profile with the one or more geometric coordinates and configured to control a velocity of the cutting tool based on at least the lead in profile,
wherein the lead in profile defines an end point of the acceleration time period such that the shape cutting or marking operation starts at the end point of the acceleration time period.

2. The system of claim 1, wherein:
the lead in profile is generated based on a cutting velocity used during the cutting or marking operation and a start location in 2 dimensional (2D) space of the desired shape for the workpiece; and
the lead out profile is generated based on the cutting velocity used during the cutting or marking operation, an end location in 2 dimensional (2D) space of the desired shape for the workpiece, and an amount of inertia.

3. The system of claim 1, wherein the cutting or marking of the workpiece is at least one of a plasma cutting operation or a plasma marking operation, respectively.

4. The system of claim 1, wherein the cutting or marking of the workpiece is at least one of a laser cutting operation or a laser marking operation, respectively.

5. The system of claim 1, wherein the cutting or marking of the workpiece is at least one of a waterjet cutting operation or a waterjet marking operation, respectively.

6. The system of claim 1, wherein the shape cutting profile defines a cutting velocity, a start time to perform the shape cutting or marking operation, and an end time to terminate the shape cutting or marking operation.

7. The system of claim 6, wherein:
the motion control component controls movement and the cutting velocity of the cutting tool with the shape cutting profile during the shape cutting or marking operation;
the motion control component controls movement and the acceleration of the cutting tool with the lead in profile before the shape cutting or marking operation to reach the cutting velocity; and
the motion control component controls movement and the deceleration of the cutting tool with the lead out profile after the shape cutting or marking operation.

8. The system of claim 6, wherein the acceleration time period of the lead in profile is defined such that the cutting tool accelerates to and reaches the cutting velocity at the start time.

9. The system of claim 6, wherein a deceleration time period of the lead out profile is defined such that the cutting tool begins to decelerate from the cutting velocity starting at the end time.

10. The system of claim 6, wherein:
the shape cutting profile is a first machine readable instruction;
the lead in profile is a second machine readable instruction; and
the lead out profile is a third machine readable instruction.

11. The system of claim 1, wherein the desired shape for the workpiece is based on input from a user.

12. The system of claim 1, wherein the lead in profile and the lead out profile are part of machine readable instructions that include a profile that defines a cutting velocity, a start time to perform the cutting operation, and an end time to terminate the cutting or marking operation.

13. The system of claim 1, wherein the lead component dynamically adjusts the generation of at least one of the lead in profile or the lead out profile based on a real time cutting parameter associated with the cutting or marking operation.

14. A system for use with a workpiece, comprising:
an implement that performs a shape cutting or marking operation on a workpiece;
an input component that is configured to receive a thickness of the workpiece, a material type of the workpiece or a cutting velocity, a start location on the workpiece, and an end location on the workpiece;
a power source that supplies a power to perform the shape cutting or marking operation;
a shape component that is configured to define one or more geometric coordinates to cut the workpiece to achieve a desired shape or mark the desired shape on the workpiece;
a lead component that is configured to generate at least one of:
a lead in profile that defines an acceleration time period of the implement prior to performing the shape cutting or marking operation based on the cutting velocity and the start location, and
a lead out profile that defines a deceleration time period of the implement after performing the shape cutting or marking operation based on the cutting velocity and the end location; and
a motion control component that is configured to control motion of the implement based on the one or more geometric coordinates, the cutting velocity, and at least one of the lead in profile or the lead out profile,
wherein the lead in profile defines an end point of the acceleration time period such that the shape cutting or marking operation starts at the end point of the acceleration time period.

15. The system of claim 14, further comprising a first set of machine readable instructions that include the one or more geometric coordinates and the cutting velocity.

16. The system of claim 15, the motion controller component appends the first set of machine readable instructions with at least one of the lead in profile or the lead out profile.

17. The system of claim 14, wherein the shape cutting operation of the workpiece is at least one of a plasma cutting, a waterjet cutting, or a laser cutting, and
wherein the shape marking operation is at least one of a plasma marking, a waterjet marking, or a laser marking.

18. The system of claim 14, wherein the lead component dynamically adjusts generation of the lead in profile based on a cutting parameter detected in real time during a time before the shape cutting or marking operation, and
wherein the cutting parameter is at least one of the cutting velocity or the thickness of the workpiece.

19. The system of claim 14, wherein the lead component dynamically adjusts generation of the lead out profile based on a cutting parameter detected in real time during a time after the shape cutting or marking operation, and
wherein the cutting parameter is at least one of the cutting velocity or the thickness of the workpiece.

20. A system for cutting or marking a workpiece, comprising:
- an implement that performs a shape cutting or marking operation on a workpiece;
- an input component that is configured to receive a thickness of the workpiece, a material type of the workpiece or a cutting velocity, a start location on the workpiece, and an end location on the workpiece;
- a power source that supplies a power to perform the shape cutting or marking operation;
- a controller that manages at least one of a power output to the implement, a voltage output to the implement, or a current output to the implement;
- a shape component that is configured to define one or more geometric coordinates to cut the workpiece to achieve a desired shape or mark the desired shape on the workpiece;
- a lead component that is configured to generate at least one of the following:
  - a lead in profile that defines an acceleration time period of the implement prior to performing the shape cutting or marking operation based on the cutting velocity and the start location, and
  - a lead out profile that defines a deceleration of the implement for a duration of time after performing the shape cutting or marking operation based on the cutting velocity and the end location; and
- a motion controller configured to control a movement of the implement based on the one or more geometric coordinates, and configured to control a velocity of the implement with the lead in profile before the shape cutting or marking operation, with the cutting velocity during the cutting or marking operation, and with the lead out profile after the cutting or marking operation,
- wherein the lead in profile defines an end point of the acceleration time period such that the shape cutting or marking operation starts at the end point of the acceleration time period.

* * * * *